United States Patent
Viana et al.

(10) Patent No.: US 8,936,254 B2
(45) Date of Patent: Jan. 20, 2015

(54) INTEGRATED CARRIER AND CARRIAGE

(76) Inventors: Aida Viana, Miami, FL (US); Lidia Viana, Miami, FL (US)

( * ) Notice: Subject to any disclaimer, the term of this patent is extended or adjusted under 35 U.S.C. 154(b) by 708 days.

(21) Appl. No.: 12/882,167

(22) Filed: Sep. 14, 2010

(65) Prior Publication Data
US 2011/0062682 A1 Mar. 17, 2011

Related U.S. Application Data

(60) Provisional application No. 61/242,223, filed on Sep. 14, 2009.

(51) Int. Cl.
*B62B 7/06* (2006.01)
*B62B 7/10* (2006.01)
*B60N 2/28* (2006.01)
*B62B 7/00* (2006.01)
*B62B 7/04* (2006.01)

(52) U.S. Cl.
CPC . *B62B 7/105* (2013.01); *B62B 7/10* (2013.01); *B60N 2/2848* (2013.01); *B62B 7/006* (2013.01); *B62B 7/044* (2013.01)
USPC ............................................ 280/30; 280/643

(58) Field of Classification Search
CPC ........ B60N 2/2848; B62B 7/006; B62B 7/10; B62B 7/105; B62B 7/044; B62B 7/08
USPC ............ 280/35, 47.34, 47.371, 47.38, 47.41, 280/638, 639, 642, 643, 647, 648, 650, 657, 280/658, 7.1, 7.11, 7.17, 33.991, 33.993, 280/33.996, 33.997, 33.998, 30, 43, 641, 280/646, 42, 47.25; 297/118, 130, 344.18
See application file for complete search history.

(56) References Cited

U.S. PATENT DOCUMENTS

| | | | | |
|---|---|---|---|---|
| 1,576,075 A | * | 3/1926 | Tisdell | 280/643 |
| 2,506,601 A | * | 5/1950 | Kelch, Jr. | 280/644 |
| 3,550,998 A | * | 12/1970 | Korol et al. | 280/31 |
| 3,679,222 A | * | 7/1972 | Guillamon | 280/644 |
| 4,679,804 A | * | 7/1987 | Johnson | 280/30 |
| 4,728,119 A | * | 3/1988 | Sigafoo | 280/657 |
| 4,763,911 A | * | 8/1988 | Gebhard et al. | 280/37 |
| 4,786,064 A | * | 11/1988 | Baghdasarian | 280/30 |
| 4,828,281 A | * | 5/1989 | Sanchas | 280/30 |
| 4,832,354 A | * | 5/1989 | LaFreniere | 280/30 |
| 4,834,403 A | * | 5/1989 | Yanus et al. | 280/30 |
| 4,872,692 A | * | 10/1989 | Steenburg | 280/30 |

(Continued)

FOREIGN PATENT DOCUMENTS

| | | |
|---|---|---|
| CA | 2304410 | 4/2001 |
| JP | 2001151119 | 6/2001 |

(Continued)

OTHER PUBLICATIONS

PCT International Search Report and Written Opinion, mailed Jun. 3, 2011 in Application No. PCT/US2010/048832 (9 pages).

*Primary Examiner* — Katy M Ebner
*Assistant Examiner* — Brodie Follman
(74) *Attorney, Agent, or Firm* — Hubbard Law, PLLC

(57) ABSTRACT

An integrated carrier and support system for supporting and moving a child that includes a carrier assembly and a support assembly. The support assembly may collapse and expand and, when collapsed, may fit cooperatively adjacent to the carrier.

19 Claims, 8 Drawing Sheets

(56) References Cited

U.S. PATENT DOCUMENTS

| | | | | |
|---|---|---|---|---|
| 4,874,182 A | * | 10/1989 | Clark | 280/30 |
| 4,989,888 A | * | 2/1991 | Qureshi et al. | 280/30 |
| 5,022,669 A | * | 6/1991 | Johnson | 280/30 |
| 5,104,134 A | * | 4/1992 | Cone | 280/30 |
| 5,133,567 A | * | 7/1992 | Owens | 280/30 |
| 5,149,113 A | * | 9/1992 | Alldredge | 280/30 |
| 5,188,380 A | * | 2/1993 | Tucek | 280/30 |
| 5,230,523 A | * | 7/1993 | Wilhelm | 280/30 |
| 5,234,224 A | * | 8/1993 | Kim | 280/30 |
| 5,324,064 A | | 6/1994 | Sumser et al. | |
| 5,398,951 A | * | 3/1995 | Ryu | 280/30 |
| 5,478,096 A | * | 12/1995 | Ting | 280/30 |
| 5,480,177 A | * | 1/1996 | Yoneda | 280/642 |
| 5,595,393 A | * | 1/1997 | Batten | 280/30 |
| 5,823,547 A | * | 10/1998 | Otobe et al. | 280/30 |
| 6,050,592 A | * | 4/2000 | Kim | 280/652 |
| 6,237,995 B1 | * | 5/2001 | Dierickx | 297/130 |
| 6,367,821 B2 | * | 4/2002 | Thiele | 280/30 |
| 6,446,990 B1 | * | 9/2002 | Nania et al. | 280/47.371 |
| 6,612,645 B1 | * | 9/2003 | Hsu | 297/195.13 |
| 6,986,518 B1 | * | 1/2006 | Besaw | 280/30 |
| 7,311,323 B1 | * | 12/2007 | Lan | 280/642 |
| 7,354,049 B2 | * | 4/2008 | Schmidt | 280/33.993 |
| 7,517,011 B2 | | 4/2009 | Aliev | |
| 7,540,507 B1 | * | 6/2009 | Kennedy | 280/30 |
| 7,543,886 B2 | * | 6/2009 | Gutierrez-Hedges et al. | 297/118 |
| 7,832,756 B2 | * | 11/2010 | Storm | 280/642 |
| 7,871,099 B2 | * | 1/2011 | Gilbertson et al. | 280/642 |
| 7,878,527 B2 | * | 2/2011 | Popp | 280/647 |
| 2004/0178593 A1 | * | 9/2004 | Szmidt et al. | 280/47.38 |
| 2007/0096435 A1 | * | 5/2007 | Gilbertson et al. | 280/642 |
| 2007/0257471 A1 | * | 11/2007 | Myers et al. | 280/642 |
| 2010/0013195 A1 | * | 1/2010 | Hsu | 280/642 |
| 2012/0267875 A1 | * | 10/2012 | Mazar et al. | 280/643 |
| 2012/0267877 A1 | * | 10/2012 | Mazar et al. | 280/648 |
| 2013/0075992 A1 | * | 3/2013 | Zhu | 280/47.38 |

FOREIGN PATENT DOCUMENTS

| | | |
|---|---|---|
| JP | 2005067418 | 3/2005 |
| WO | WO-2009065136 | 5/2009 |

\* cited by examiner

INTEGRATED CARRIER AND CARRIAGE

CROSS-REFERENCE TO RELATED APPLICATION

This application claims the benefit of U.S. provisional application No. 61/242,223 filed Sep. 14, 2010, which is incorporated herein by reference in its entirety for all purposes.

BACKGROUND

The invention pertains generally to carriers, car seats and strollers for infants and/or toddlers.

SUMMARY

A carrier is integrated with an extendable or "pop-up" carriage with wheels. When the carriage portion is in a collapsed position, it is tucked compactly under the carrier, which permits the infant carrier to be carried and, if adapted for such use, used as a car seat. When the carriage is extended, the carrier is lifted off the ground. An extendable handle enables the integrated system to be pushed.

In one representative example of an infant or child carrier, a shell in which an infant/child is placed in a reclined or supine position is adapted to cooperate with a portion of a frame of the carriage. The frame is movable between at least one extended position and a collapsed position. In an extended position, the plurality of wheels roll on the ground and shell is supported above the ground (e.g., via a central shaft), the shell being adapted for supporting an infant in a reclined or supine position. The support assembly in a collapsed position allows the carrier to be compact, able to be adapted as a seat for use in a car or to be carried. The support assembly in an extended position allows the carrier to be raised off the ground.

In another representative example, the shell is shaped to compliment and to accommodate at least in part the wheels and frame of the carriage when in a collapsed position. The shell is formed and shaped that it may receive and cooperate with the frame when the support assembly is in a collapsed or retracted position.

DESCRIPTION

Figure 1:
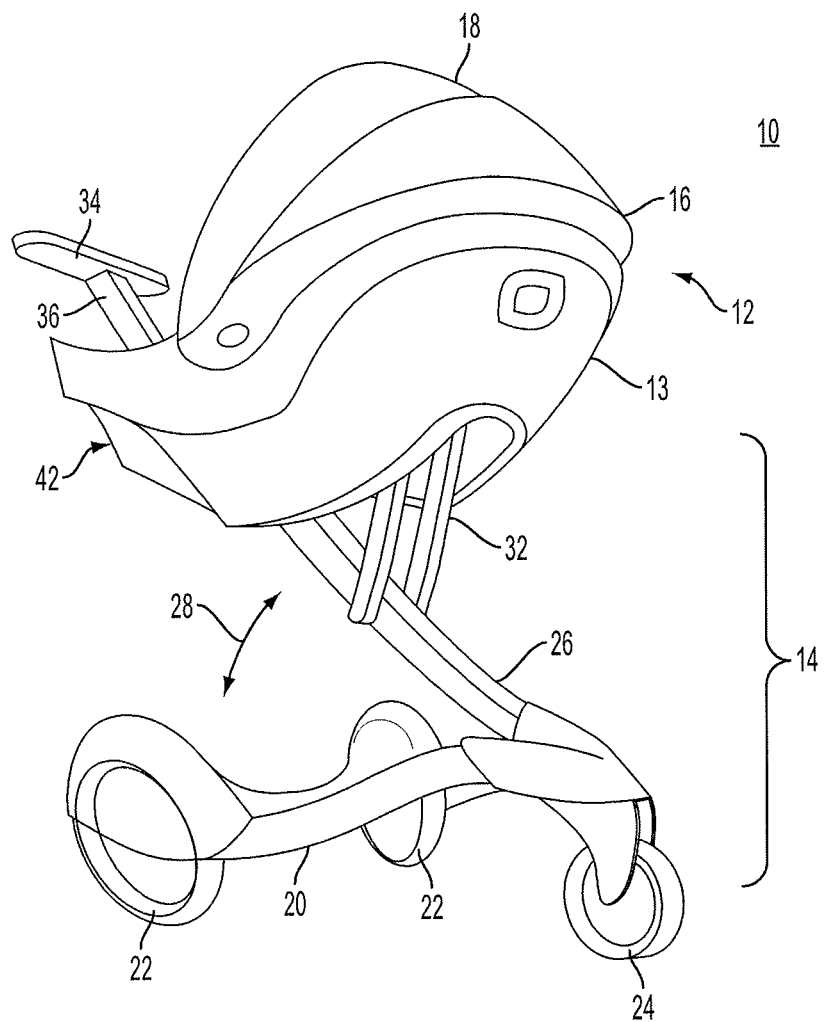
FIG. 1 illustrates a perspective view of a representative integrated infant carrier and carriage in an extended position.

Although making and using various embodiments are discussed in detail below, it should be appreciated that as described herein are provided many inventive concepts that may be embodied in a wide variety of contexts. Embodiments discussed herein are merely representative and do not limit the scope of the invention.

The drawing figures are not necessarily to scale and certain features may be shown exaggerated in scale or in somewhat generalized or schematic form in the interest of clarity and conciseness. In the following description, like numbers refer to like elements.

Figure 2:
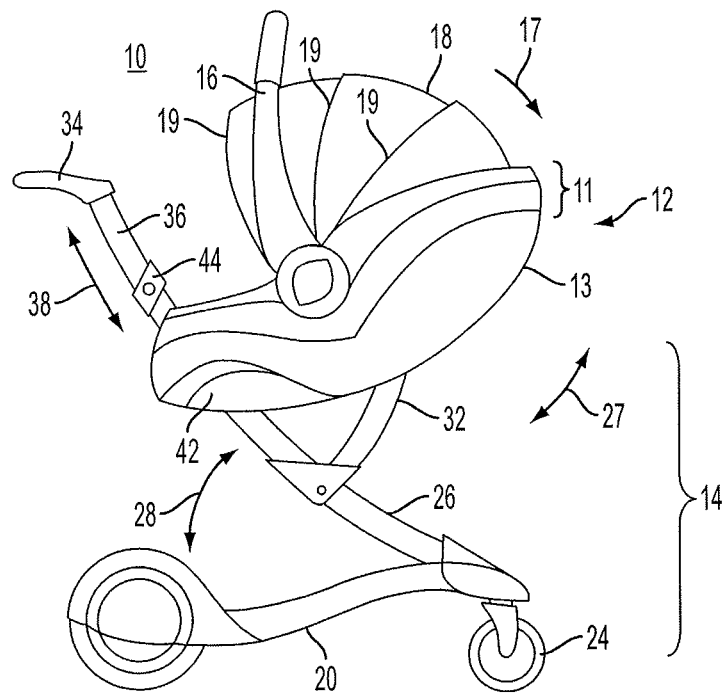
FIG. 2 is a side view of the representative integrated infant carrier and carriage of FIG. 1.
Figure 4:
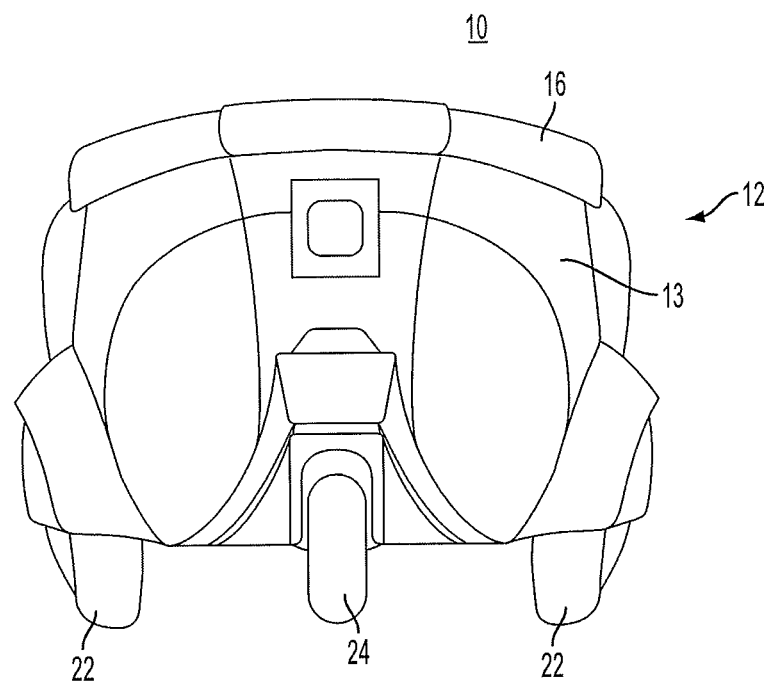
FIG. 4 is a front view of the representative integrated infant carrier and carriage of FIG. 3.
Figure 5:
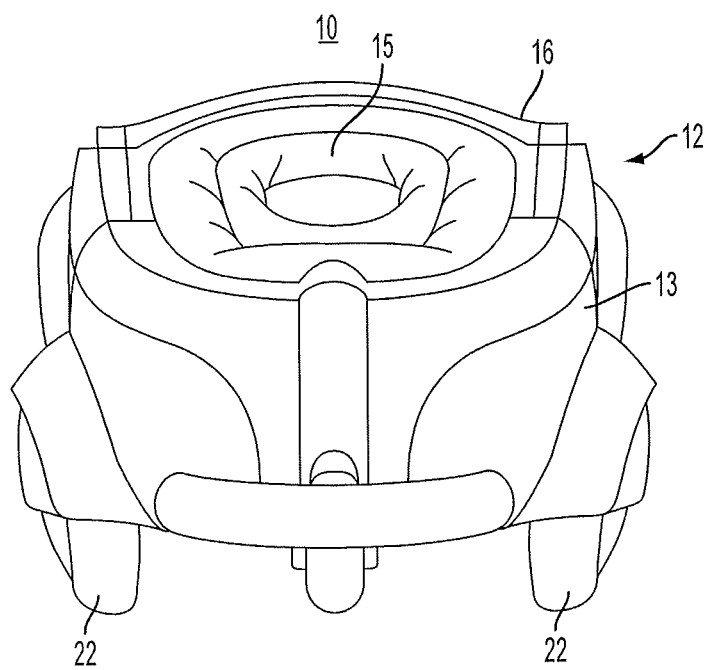
FIG. 5 is a rear view of the representative integrated infant carrier and carriage of FIG. 3.
Figure 6:
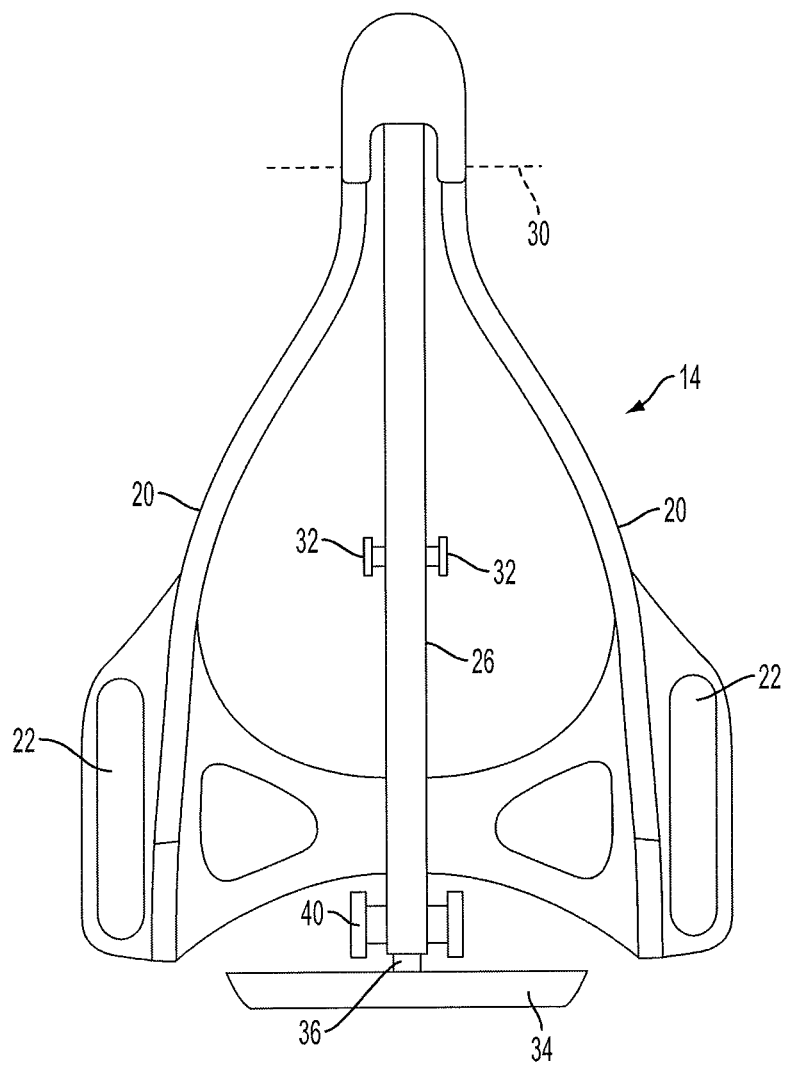
FIG. 6 is a bottom plan view of the carriage portion as described herein.

Referring now to FIGS. 1-6, an integrated infant carrier and carriage 10 is shown that includes carrier 12 and a cooperating support assembly or carriage portion 14, to which the carrier is coupled. Said coupling is generally cooperative with a pivoting or sliding mechanism. Alternative coupling mechanisms known to one skilled in the art are also suitable for use. The pivoting mechanism may include releasing-locking mechanisms with or without sliding features known to those skilled in the art. The pivoting or releasing-locking mechanism may be threaded or non-threaded (e.g., screw, clip, pin, as examples or other holding device). When integrated, carriage portion 14 may be positionable in either an extended or in a retracted position. Locking mechanisms prevent the carriage from collapsing when in a fully extended position. Similarly, locking mechanisms prevent the carriage from expanding when in a fully collapsed position. Locking mechanisms may be self-locking. The carriage portion 14 when extended is illustrated in FIGS. 1, 2 and 6. FIG. 6 shows the assembly of portion 14 in a retracted position.

Figure 3:
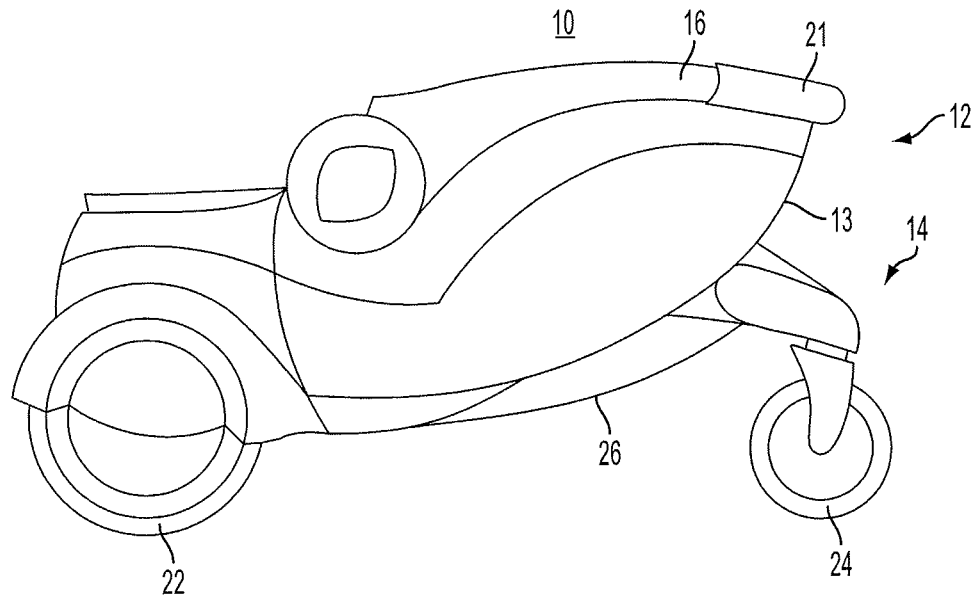
FIG. 3 is a side view of the representative integrated infant carrier and carriage of FIG. 2 in a collapsed position.

Carrier 12 is generally comprised of a lightweight, outer shell 13 and an internal lining 15, which may include one or more paddings as well as a durable cover that overlaps all or a portion of the shell. A cover, if used, could be made removable and washable and protects the internal lining. The outer shell is preferably made of a hardened and lightweight material, such as plastic, aluminum or a lightweight, durable composite. The carrier generally includes a safety or restraining system (not shown). The carrier may optionally include a pivoting handle 16 that in one form may be positioned upwards, as shown in FIG. 2, and during use is operable so that the carrier may be carried manually. In addition, such a handle may be folded downward (as shown in FIG. 1) to form cleanly with carrier 12. Such a handle may include a grip, padding, or additional material for handling (see 21 of FIG. 3). The handle is generally shaped in a manner that conforms with the shape of the carrier when in a downwardly folded position. Carrier 12 is adapted to and shaped to receive an infant in a reclining or a more supine position as embodied in FIGS. 1 and 2. The carrier may also be adapted for use as a car seat with the infant in a proper orientation and with restraint by an appropriate restraining system, such as seatbelts or straps, meeting applicable requirements (not shown). The carrier 12 may also optionally include a pivotally connected cover or sunshade portion 18 that may be pivoted to a fully extended and open position, a partially extended and open position or a fully closed position. The cover portion 18, generally of a fabric or mesh, includes periodically placed ribs 19, each rib end coupled to a pivot point placed generally near each pivoting portion for handle 16 on carriage 12 (not shown). The coupling of ribs and pivot connections allow the cover to open and to fold and close, which is in a downwardly direction (see arrow 17) so that it can be collapsed and stored in an unobstructed way when not open or in use. In FIGS. 1 and 2, cover 18 is shown in an extended and open position. In FIGS. 3-5, cover 18 and handle 16 are both shown in retracted positions.

Referring to FIGS. 1 and 2, carriage portion 14 further includes a frame to which are mounted, via a central shaft, a plurality of wheels. Generally, at least three wheels are included as part of carriage 14. Wheels may be covered or uncovered and some or all of the wheels may each have a brake or brake system associated with the wheel. In FIGS. 1-6, three wheels are depicted, including two rear wheels 22 spaced apart by arms 20 and a forward wheel 24. The frame may be further adapted to support one or more additional wheels. A fourth wheel may be accommodated, for example, by configuring the frame to allow for a second and spaced apart forward wheel. Furthermore, in order to increase stability, a larger forward wheel 24 or two or more parallel and close fitting forward wheels may be utilized rather than two spaced apart forward wheels.

In the illustrated example, the frame supports carrier 12 and includes central boom or shaft 26 and spaced apart arms 20. Boom 26 pivots when the carriage is extended into the position shown in FIGS. 1 and 2. The motion of boom 26 with reference to carrier 12 is generally indicated by arrow 27. Boom 26 pivots or slides about an axis 30 (see FIG. 6). With reference to arms 20, motion of central shaft 26 will include a slideable or pivoting mechanism with an appropriate joint adapted to slide and/or pivot and, thus, position the frame in at least a fully expanded position and in at least a fully retracted or collapsed position; the motion is shown by arrow 28. Although not shown, the frame preferably includes a releasable catch or alternative release mechanism for selectively locking boom 26 into at least a fully extended position and into at least a fully retracted position. In one or more embodiments, the boom is curved and shaped to accommodate a shaped rear portion of the shell, thus conforming the central shaft with the carrier when the frame is in a fully retracted or fully collapsed position. An example of the fully retracted position is illustrated in FIGS. 3-5.

In order to further assist in supporting carrier 12 on the frame, a strut or a strut assembly 32 is coupled to the boom and to a rear portion of shell 13 of carrier 12. The placement of the strut assembly is generally such that carrier 12 may be positioned horizontally or tilted with a top end 11 elevated with respect to the opposite end (see FIG. 2). Such positionings allows an infant when placed in carrier 12 to either respectively lie in a supine position or to have the head elevated with respect to the feet. Strut assembly 32 may fold at a pivot point when the support assembly or carriage 14 is collapsed or may slide at a slideable joint or may include a telescoping feature that allows it to extend and retract. Generally, when fully collapsed, shell 13 of the carrier is in close proximity to or directly adjacent to boom 26 (see FIG. 3). Shell 13 has defined along part of its underside a recess for receiving the boom when in a collapsed position. During collapse of the carriage, there is a coupling whereby the strut assembly attached to shell 13 is permitted to translate and pivot, thereby accommodating the folding strut into the bottom of the shell of the carrier 12. A coupling with which the strut assembly is coupled with the boom may permit pivoting of the strut assembly and boom and/or may also permit transaction or telescoping. When carriage 12 is in a fully extended or fully retracted position, the pivot or translated axes for the strut assembly are, preferably, releasably locked against translational movement. The mechanism may be self-locking. Similarly, when translational or telescoping movement is used, it will generally include a self-locking and/or releasably locking mechanism.

Handle 34 is connected to a connector, rod or bar 36 which is generally received within an end of boom 26. Handle 34 may extend outwardly by pulling in a somewhat upwardly direction and away from boom 26; extension is generally in a telescoping fashion. Handle 34 may be extended from carriage 12 and pushed inwards towards carriage 12 to an adjustable level, as indicated by arrow 38 in FIG. 2. Adjustment generally occurs when the carriage is in an expanded position and may also occur when the carriage is retracted or collapsed. In one or more embodiments, adjustment may occur by a telescoping means, one that includes a catch-release mechanism 44, such as one with a lever, button or pin and may also be adapted with an alternative cooperative design.

Infant carrier 12 may made to be removable from boom 26. As described, struts 32 couple the carrier to boom 26; coupling is generally near a mid-portion of the boom and may be towards its lower end as shown in FIGS. 1 and 2. Coupling mechanisms that include a pivot joint are shown in FIGS. 1 and 2. As shown in FIG. 6, coupling mechanism 40 connects a rear end of the carrier 12 to near the top end of boom 26 in a manner that permits the boom and carrier to articulate or slide with respect to each other during extension and collapse of carriage portion 14.

Figure 10:
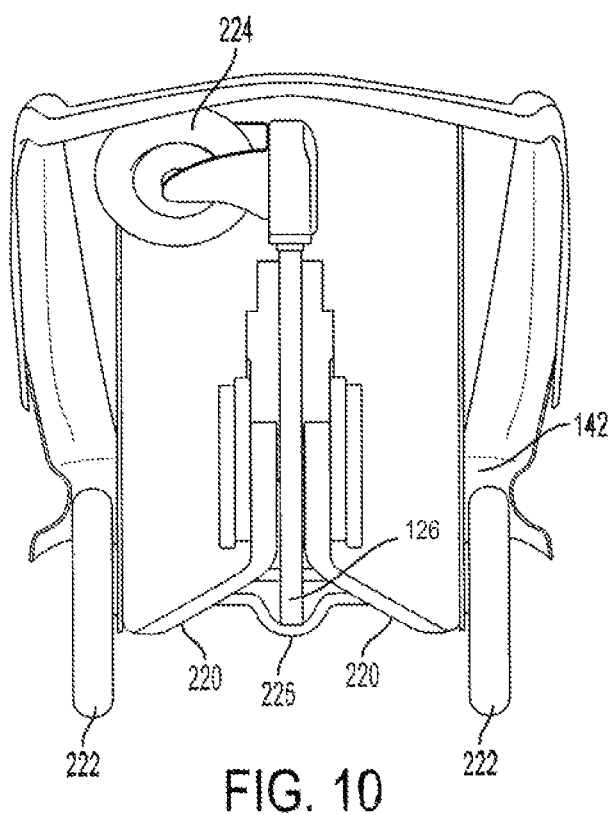
FIG. 10 depicts a back view of the representative integrated carrier and support of FIG. 9.
Figure 11:
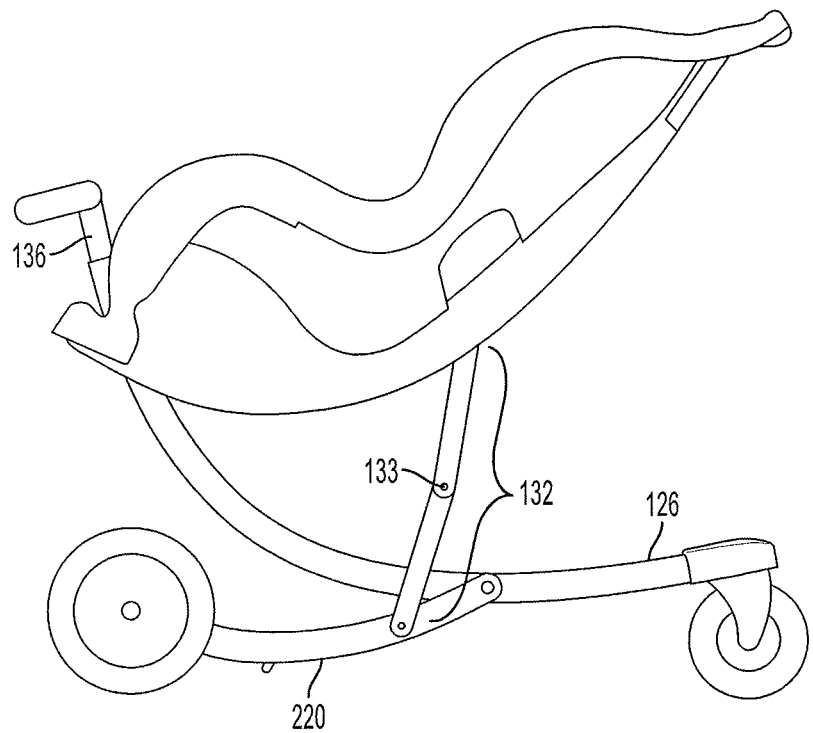
FIG. 11 depicts a side view the representative integrated carrier and support of FIGS. 7 and 8.

Shell 13 of the carrier 12 is preferably shaped on its underside to accommodate the frame. For example, in addition to the boom, recesses 42 in the shell 13 accommodate, in whole or in part, rear wheels 22, an example of which is shown in FIGS. 3-5. An additional recess on the underside of shell 13 may be included to accommodate forward wheel 24 in a downward position, as shown in FIG. 4, or in a sideways position, as shown in FIG. 10.

When the carriage portion is in a collapsed position, and when it remains attached, the carriage portion may generally be tucked compactly under the carrier (e.g., FIGS. 3-5), which permits the carrier to be carried by its handle and, if adapted for such use, positioned for use as a car seat. When the carriage is extended, the carrier is lifted off the ground. Extendable handle 34 enables the carrier to be pushed when accompanied with wheels.

Referring now to FIGS. 7-13, depicted is an alternative embodiment of an integrated child carrier and carriage system 110 comprising a carrier assembly 112 and a cooperating support assembly 114. Carrier assembly 112 and support assembly 114 may be fixedly coupled or may be connected or coupled in a manner to permit a user to separate the two. Examples of a selectively releasable include one or more articulating or pivoting joints, and connections that both pivot and slide or just slide. Additional coupling mechanisms known to one skilled in the art may also suitable for use. The joints may include manually settable and/or releasable locking mechanisms and/or self-locking mechanisms that are manually released. Support assembly 114 may be in an extended position as shown with FIGS. 7, 8 and 11 or in a retracted position as shown in FIGS. 9-10 and 12-13. Locking mechanisms, whether self-locking or not, prevent the support assembly from collapsing or retracting when the support assembly is in an extended position. Similarly, locking mechanisms prevent the support assembly from expanding when it is in a fully collapsed or retracted position.

Figure 12:
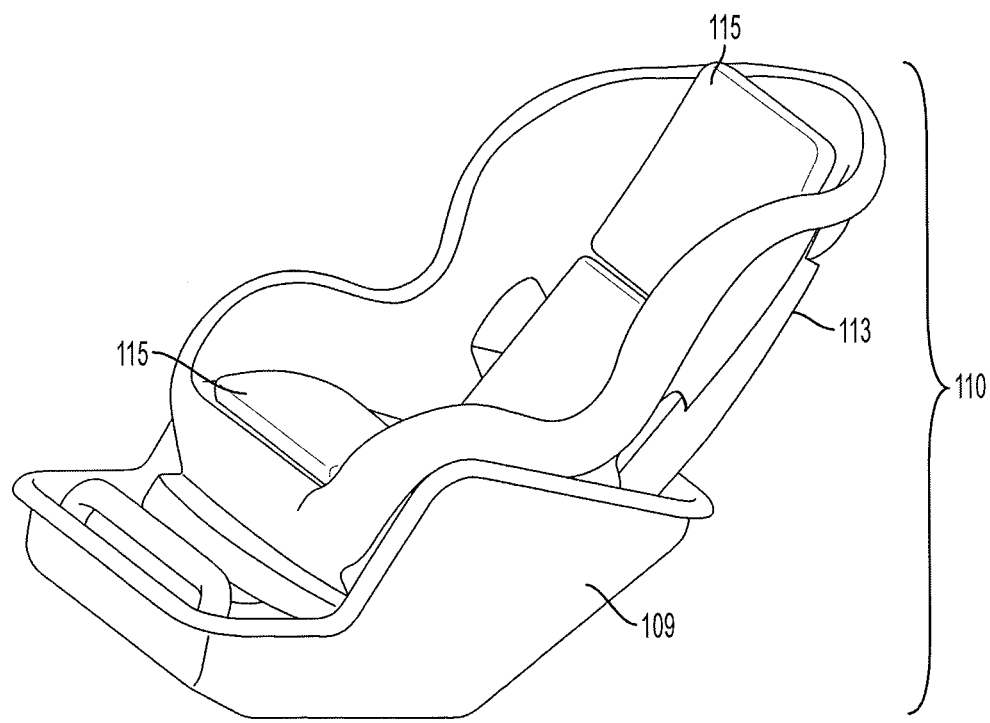
FIG. 12 depicts in perspective view the representative integrated infant carrier and carriage of FIG. 7 in a collapsed position and in a base.
Figure 13:
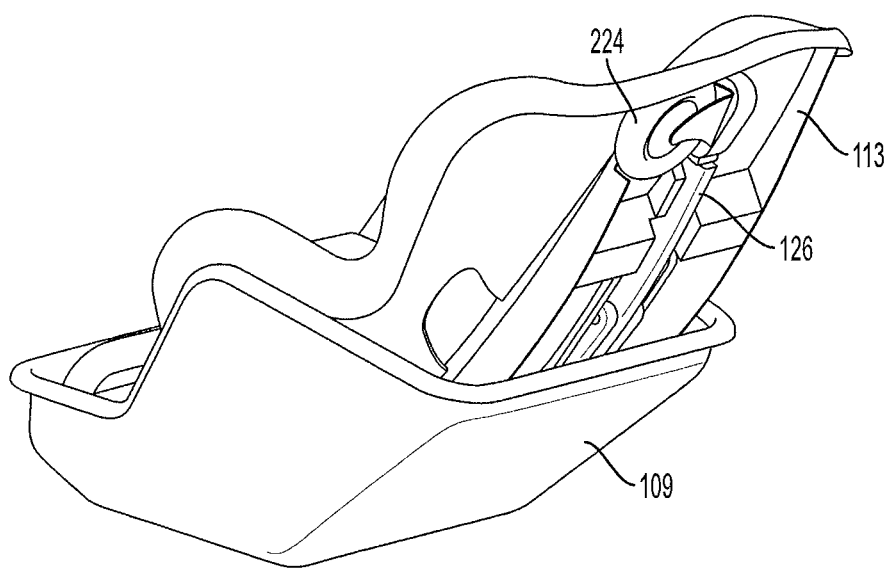
FIG. 13 depicts in perspective view a back portion of the representative integrated infant carrier and carriage and base of FIG. 12.

A carrier assembly comprises generally a lightweight shell 113. The shell may be shaped for infants or toddlers and will generally include a lining or padding 115, a cover and a safety system for suitable restraint (not shown). The carrier may optionally include a handle or device for carrying that may pivot or be releasably attached as well as a shade that may be adjustable and/or detachable (not shown). The handle may be centrally located or located near the top end 111 of shell 113. The cover may include snaps or hooks or pins or other suitable devices for affixing the cover to the shell. The cover may wrap around only a portion of the shell, generally where the child is placed. Carrier assembly, when adapted for use as a car seat may include a base 109, as shown in FIGS. 12 and 13. In one example, base 109 is of a size sufficient to extend across and cover at least a portion of the rear wheels and generally fits around the entire lower portion of the integrated unit when in a collapsed position as shown in FIGS. 12 and 13.

Referring to FIGS. 7-11, support assembly 114 further comprises a frame to which is mounted a plurality of wheels, preferably at least three wheels so that the carrier is stably supported when the frame is in an extended position with the wheels on the ground, with the infant in a supine or reclined position. In the example shown in FIGS. 7-8 and 11, three wheels are mounted to the frame. Additional wheels could be mounted, but at the expense of increased bulk or size. One or more of the wheels may or may not include covers and/or brakes. When wheels are not required, the ends of the frame may have a fixed support means for holding the frame and to prevent collapse of the frame. Three wheels are illustrated in the figures with two rear wheels 222 and a forward wheel 224. In the example, the front wheel is designed to swivel and thus direct rotation and movement of the integrated carriage and support assemblies. The frame may be adapted to support one or more additional wheels. A fourth wheel may be accommodated, for example, by configuring the frame to allow for a second spaced apart forward wheel. Furthermore, in order to increase stability, a larger forward wheel 224 or two or more parallel and close fitting forward wheels may be utilized rather than two spaced apart forward wheels.

The frame includes central shaft or boom 226 and arms 220. Boom 126 is coupled with the carrier assembly at a pivot or joint 107. The coupling, in this example, is comprised of a pivot or hinge, but could comprise a sliding pivot or a hinge or a structure that permits the boom to translate or slide and articulate as necessary while remaining coupled with the carrier assembly. The motion of boom 126 with reference to point 107 (e.g., as the frame is moved from a collapsed to an expanded position) is shown by arrow 227. Arms 220 are coupled to boom 126 at point 229. The coupling can be pivoting—such as a hinge—and/or can also translate or slide. The frame generally includes one or more a releasable catch or locking mechanisms or similar mechanisms for selectively locking boom 126 in one or more extended positions and a retracted position. A lever, such as lever 225 shown in FIG. 10, can be provided or manually releasing the catches or locks to extend or retract the support assembly.

Figure 9:
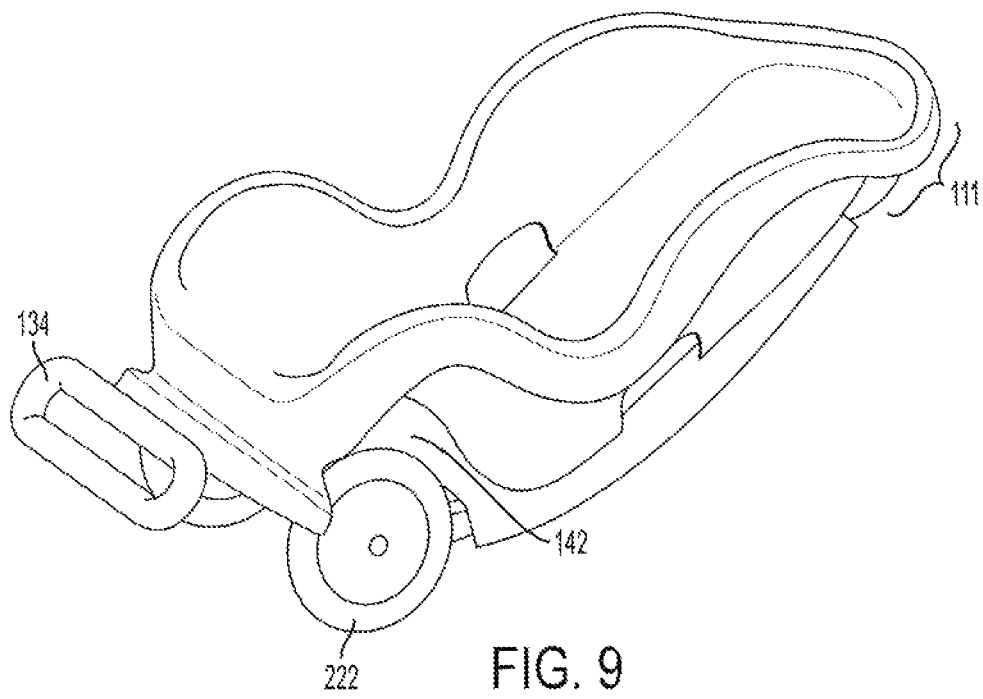
FIG. 9 depicts a perspective view of the representative integrated carrier and support of FIG. 7 in a collapsed position.

In one or more embodiments, the boom is curved and shaped to accommodate with a backside of the carrier, as shown in FIG. 10. It generally extends along most, if not the entire, length of the backside of the carrier, along its central axis. The accommodation may include recesses or an elongated region or groove shaped to and conforming with the shape of the boom. In such a position, forward wheel 224 may sit in a recess that accommodates the wheel and when in such a position, the wheel may be optionally locked or fixedly placed. In addition, rear wheels 222 may fit into recesses 142 as shown in FIGS. 9 and 10, which are generally positioned on opposite sides of shell 113. Thus, shell 113 may generally be designed and shaped to allow the support assembly and frame to conform into recesses, spaces and grooves of the shell when collapsed in order to allow for a more fully collapsed configuration of the entire system.

Strut assembly 132 is coupled to the boom and to a rear portion of shell 113. The placement of the strut assembly allows a child when placed in shell 113 to either lie in a supine or reclining position. The strut assembly preferably couples to the shell at two, spaced-apart points to provide, with the booms coupling to the shell, three-point stability. The strut assembly 132 collapses generally by folding and/or sliding. In the example, the strut assembly is comprised of two links that folds at a pivot point 133 when the support assembly 114 is collapsed. As an alternative, strut assembly 132 may include telescoping elements that allows it to extend and retract. Generally, when fully collapsed, shell 113 of the carrier is in close proximity to or directly adjacent to boom 126. Shell 113 has defined along part of its underside a recess for receiving the boom when in a collapsed position. During collapse of the carriage, a coupling 105 with which the strut assembly is attached to shell 113 is permitted to translate and pivot, thereby accommodating the folding strut into the bottom of the shell; the coupling may be pivoting of the strut assembly and boom and/or transaction or telescoping. When the support assembly is in a fully extended or a fully retracted position, the strut assembly is, preferably, releasably locked against movement.

Handle 134 is connected to a connector, rod or bar 136 (see FIG. 11) which is generally received within an end of boom 126. Rod 136 may extend in length by pulling in a somewhat upwardly direction and away from the rod receiving end of boom 126. In one form, as shown, extension occurs in a telescoping fashion and may generally include a catch-release mechanism for fixing in position. Alternative means for extending rod 136 and raising handle 134 are also suitable, as desired. Adjustment of handle 134 with respect to boom 126 may occur when the support assembly is in a fully expanded position. When the support assembly is in a fully collapsed position, handle 134 is lowered as shown in FIG. 9, which may be compared with FIG. 7, in which the handle is elevated when the support assembly is in a fully extended position. While, in some forms, handle 134 may be extended away from boom 126 even when the support assembly is in a collapsed position, it is more meaningful and customary for handle 134 to be in a non-extended position such that rod 136 is not extended and handle 134 is not obstructive.

Figure 7:
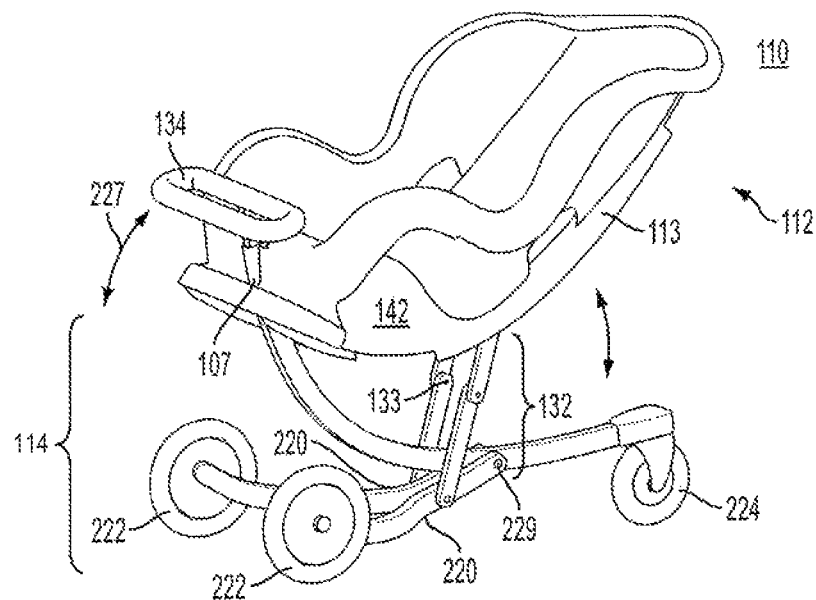
FIG. 7 depicts a perspective view of another representative integrated carrier and support in an extended position.
Figure 8:
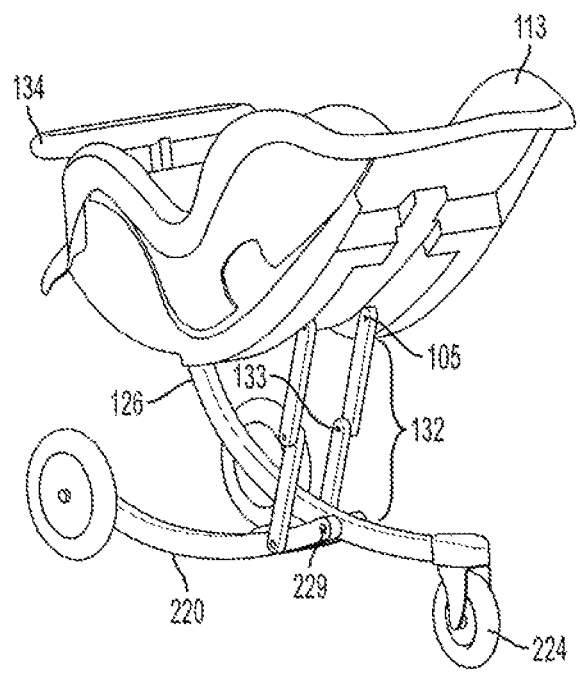
FIG. 8 depicts in perspective view a back portion of the representative integrated carrier and support of FIG. 7.

The carrier assembly may be removable from boom 126 via a release of connections between the shell 113 and the boom and the strut assembly 132. In some forms, handle 134 and rod 136 are also removable. Coupling of the shell to boom 126 is generally near a mid-portion of the boom and may be towards its lower end as shown in FIGS. 7 and 8. Alternative coupling mechanisms now shown may be suitable, such as those that permit the boom and shell to articulate and/or slide with respect to each other during extension and collapse of the support assembly. When the carriage is extended, the carrier is lifted off the ground. Extendable handle 134 enables the carrier when on a support assembly with wheels to be pushed and moved.

As described previously, shell 113 is preferably shaped or molded to accommodate the support assembly. For example, recesses in the shell are generally included that accommodate, in whole or in part, rear wheels 122 and one or more forward wheels 224. An example of recess 142 is shown in FIG. 10. An additional recess on the underside of shell 113 may be included to accommodate forward wheel 224, as shown in FIG. 10.

When the support assembly is in a collapsed position and when it remains attached, the carriage portion is tucked compactly under the shell making way for a cooperative connection of the integrated carrier and carriage to a base 109 (e.g., FIGS. 12-13). The cooperative connection to a base allows the unit to be for used as an infant seat in a vehicle (e.g. automobile, plane, train). Base 109 includes a locking mechanism or catch for removably attaching the unit to the base. For example, the base 109 can include snap fit features to allow the shell to remain fixedly attached to the base and to be released quickly. Although not shown, the base would generally include, in this example, slots for belts and/or tethers for connecting the base to a seat, such as a seat of a car. The base may remain in a vehicle after the support assembly with shell is detached.

In each of the examples described above, the central boom or shaft could be replaced with a multi-member frame. One advantage of a central boom or shaft is that the carriage or support assembly and carrier can be made more compact. Such advantage might be lost with a multi-member frame, such as one with members extending along either side of the central line of the carrier. Furthermore, one or more components of the frame of the carriage or support assembly of the foregoing examples can be made of steel, aluminum, plastic and/or high strength composites. Additionally, each of the example could be adapted to incorporate a mechanism or means for providing mechanical assistance in extending and/or retracting the carriage or support assembly. Examples of such a means include pneumatic or hydraulic pistons, springs and motors. Struts 32 or strut assembly 132 could, for example, take the form of pneumatic, hydraulic or other types of piston.

The foregoing description is of examples embodying, at least in part, certain teachings of the invention. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments.

What is claimed is:

1. An infant carrier comprising:
   a lightweight shell made of a hardened material for supporting an infant in a supine or reclining position; and
   a support assembly coupled with the shell, the support assembly comprising a frame, to which are mounted at least three wheels, the frame comprising a curved shaft coupled with the shell for moving between an extended position and a retracted position, the support assembly supporting the shell above the ground, with the at least three wheels on the ground and the shell positioning the infant in a supine or reclining position, when the shaft is in an extended position;
   wherein the shaft is centrally located and the support assembly further comprises arms extending away from the shaft and shell when the central shaft is moved to the extended position, and retracting toward the shell when the central shaft is moved to a retracted position, each of the arms having mounted to it at least one of the at least three wheels.

2. The infant carrier of claim 1, wherein the shell is shaped and configured with recesses to at least partially receive the support assembly when the shaft is in the collapsed position, the shaft being accommodated when in a retracted position along a bottom side of the shell.

3. The carrier of claim 1 further comprising a base to which the carrier is connected when the support assembly is in a collapsed position, the base being adapted for being restrained against a seat of a moving vehicle.

4. An infant carrier comprising:
   a lightweight shell made of a hardened material for supporting an infant in a supine or reclining position; and
   a support assembly coupled with the shell, the support assembly comprising a frame having a front and back, to which are mounted a plurality of wheels comprising at least three wheels, the frame comprising a curved central shaft coupled with the shell for moving between an extended position and a retracted position, the support assembly supporting the shell above the ground, with the at least three wheels on the ground and the shell positioning the infant in a supine or reclining position, when the shaft is in an extended position;
   wherein the plurality of wheels includes one wheel in the front and two spaced apart wheels in the back;
   wherein the shaft is centrally located; and
   wherein the front wheel is mounted to one end of the shaft, opposite an end to which is coupled the shell.

5. An infant carrier comprising:
   a lightweight shell made of a hardened material for supporting an infant in a supine or reclining position; and
   a support assembly coupled with the shell, the support assembly comprising a frame having a front and back, to which are mounted a plurality of wheels comprising at least three wheels, the frame comprising a curved shaft coupled with the shell for moving between an extended position and a retracted position, the support assembly supporting the shell above the ground, with the at least three wheels on the ground and the shell positioning the infant in a supine or reclining position, when the shaft is in an extended position;
   wherein the plurality of wheels includes one wheel in the front and two spaced apart wheels in the back; and
   wherein the back wheels are mounted to the shaft via spaced apart arms.

6. An infant carrier comprising:
   a lightweight shell made of a hardened material for supporting an infant in a supine or reclining position; and
   a support assembly coupled with the shell, the support assembly comprising a frame having a front and back, to which are mounted a plurality of wheels comprising at least three wheels, the frame comprising a curved shaft coupled with the shell for moving between an extended position and a retracted position, the support assembly supporting the shell above the ground, with the at least three wheels on the ground and the shell positioning the infant in a supine or reclining position, when the shaft is in an extended position;
   wherein the plurality of wheels includes one wheel in the front and two spaced apart wheels in the back; and
   wherein the shell is formed to at least partially accommodate the back wheels when the central shaft is moved to a retracted position.

7. The carrier of claim 1, wherein the support assembly further comprises extendable struts coupled with the shell at at least two points for supporting the shell when the support assembly is in an expanded position.

8. The carrier of claim 1, wherein the shaft is adapted to fit a handle used to maneuver the support assembly when in an expanded position.

9. A carrier comprising:
a carrier shaped to receive and to support an infant in a reclined or supine position, the carrier comprised of a unitary shell of rigid material;
means coupled with the carrier for selectively raising and lowering the carrier from the ground, the means for selectively raising and lowering the carrier comprising an elongated shaft extending from front to back of the carrier, from which depends at least three wheels and being selectively moveable between an extended and a retracted position with respect to the carrier, the carrier having a backside shaped to at least partially receive the means for selectively raising and lowering the carrier when in a retracted position; and
a handle for manually pushing the carrier when in a raised position.

10. The carrier of claim 9, further comprising means for extending and retracting the handle.

11. The carrier of claim 9, wherein the elongated shaft a central shaft coupled near one end of the carrier, the central shaft moving between an extended and retracted position in order to raise and lower the carriage, the carrier being supported on the shaft to hold the infant in a supine or reclined position when the carrier is raised above the ground and supported on the ground by the at least three wheels.

12. The carrier of claim 11, further comprising a strut assembly pivotally coupled to the central shaft for supporting the carrier on the shaft.

13. The carrier of claim 9, wherein the means for selectively raising is comprised of a curved, central member extending along the length of the backside of the carrier.

14. The carrier of claim 13, wherein at least two of the at least three wheels are mounted to a pair of spaced apart arms extending from the central shaft.

15. The carrier of claim 9, wherein the means for selectively raising and lowering is comprised of a means for locking the carrier in a raised or lowered position.

16. The carrier of claim 9, further including means for mechanically assisting in moving the means for selectively raising and lowering the carrier.

17. An apparatus comprising:
a carrier comprising a shell made of hardened and lightweight material for carrying a child in a reclined or supine position;
an articulating support assembly cooperating with the carrier, the articulating support assembly comprising a elongated shaft extending under the carrier from front to back, to which are mounted a plurality of wheels, the articulating support assembly extending between a retracted position and at least one extended position, the carrier being shaped to accommodate and receive at least in part the support assembly, the support assembly adapted for supporting the carrier above the ground when in an extended position, the carrier being adapted for supporting an infant in a reclined or supine position when the support assembly is in the extended position and the plurality of wheels are on the ground.

18. The apparatus of claim 17, wherein the carrier is adapted for use as an infant car seat.

19. The apparatus for claim 18, wherein the elongated shaft is comprised of a single, centrally located boom, to which the carrier is coupled at one end.

* * * * *